United States Patent [19]

Mauclere et al.

[11] Patent Number: 4,465,899
[45] Date of Patent: Aug. 14, 1984

[54] BOX FOR TRANSMISSION LINE REPEATERS

[75] Inventors: Bernard Mauclere, Maurepas; Daniel Jamet, Nozay, both of France

[73] Assignee: Compagnie Industrielle des Telecommunications Cit-Alcatel, Paris, France

[21] Appl. No.: 376,050

[22] Filed: May 7, 1982

[30] Foreign Application Priority Data

May 7, 1981 [FR] France .................. 81 09072

[51] Int. Cl.³ .............................. H05K 5/00
[52] U.S. Cl. .................... 174/52 R; 174/59; 361/415
[58] Field of Search .............. 174/52 R, 59, 60; 339/17 R, 17 L, 17 LC, 17 LM, 17 M, 17 N; 361/393, 412, 413, 415, 426

[56] References Cited

U.S. PATENT DOCUMENTS

| | | | |
|---|---|---|---|
| 1,956,534 | 4/1934 | Mumple | 174/60 X |
| 3,173,732 | 3/1965 | James | 339/17 LM |
| 3,671,813 | 7/1972 | Wilcox | 174/52 FP X |
| 3,699,396 | 10/1972 | Colaud | 361/415 |
| 3,912,353 | 10/1975 | Kasuya et al. | 361/415 X |

FOREIGN PATENT DOCUMENTS

| | | |
|---|---|---|
| 1044207 | 11/1958 | Fed. Rep. of Germany . |
| 2445381 | 11/1976 | Fed. Rep. of Germany . |
| 2814018 | 10/1979 | Fed. Rep. of Germany . |
| 7911860 | 7/1980 | Fed. Rep. of Germany . |
| 2321794 | 3/1978 | France . |
| 2440636 | 12/1981 | France . |

Primary Examiner—G. P. Tolin
Assistant Examiner—D. A. Tone
Attorney, Agent, or Firm—Sughrue, Mion, Zinn, Macpeak, and Seas

[57] ABSTRACT

The box comprises a shallow bowl (1) which is hermetically sealed to a bell-shaped cover (2). Repeaters are housed in individual casings (4) which are fitted into a mother board (3) extending over the greater part of the bowl. Connector tabs (20) are provided through the mother board, with pressure contact points for making electrical contact with the individual repeater casings, and self-stripping prongs for making electrical contact with the insulated wires of a cable (8). This arrangement leads to very few connections being made in the path between a cable conductor and a repeater, and enables the box to be wired to a cable on site and without soldering.

6 Claims, 10 Drawing Figures

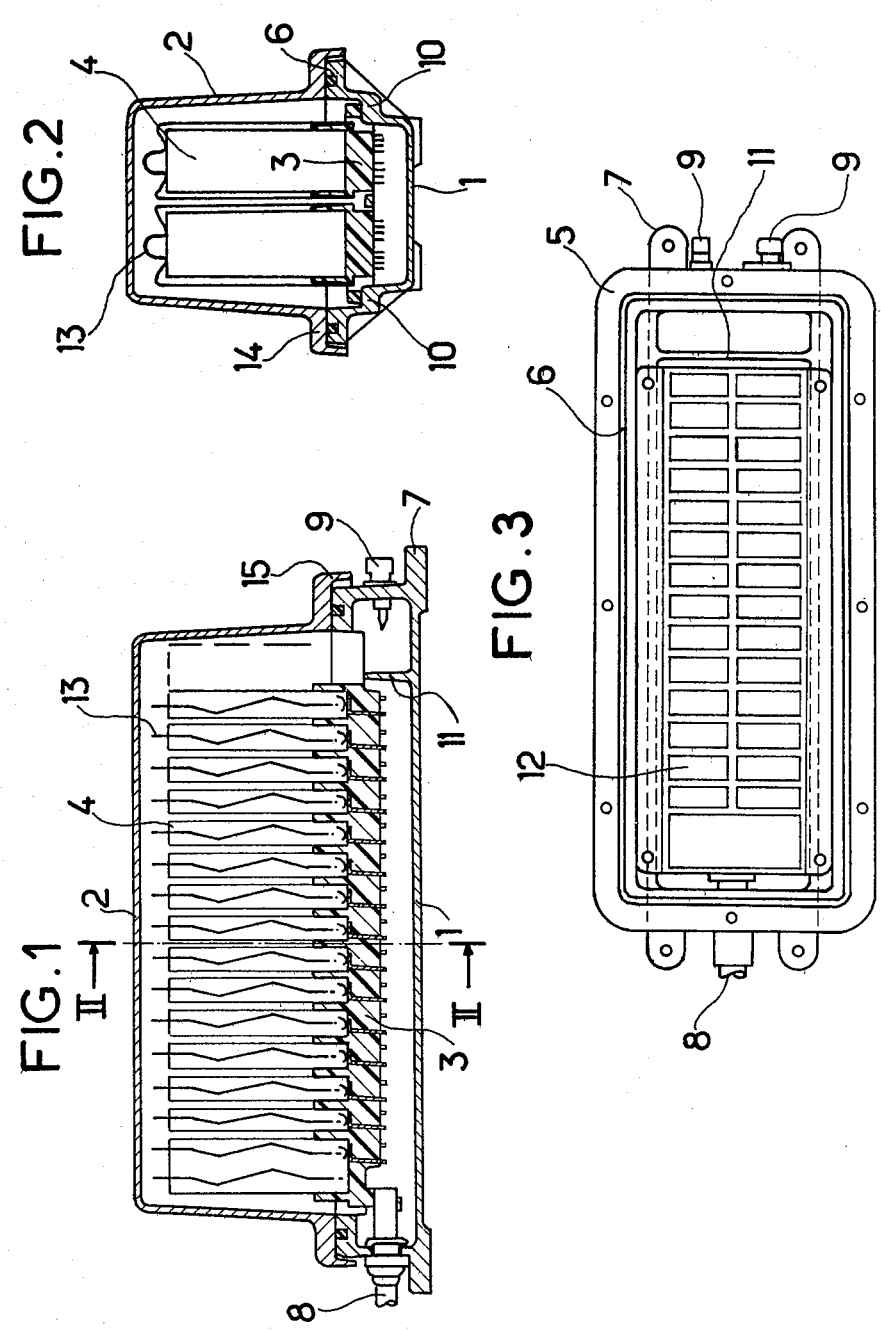

BOX FOR TRANSMISSION LINE REPEATERS

A box for transmission line repeaters comprises a sealed enclosure housing repeaters in individual casings together with means for providing electrical connections through the sealed enclosure between the repeater units and the cables of a transmission line.

BACKGROUND OF THE INVENTION

Repeater boxes are known in which the sealed enclosure is constituted by a tank having a cover which closes hermetically thereon. Inside there is a frame with slots for individually housing the repeaters. Electrical connections are provided by means of a stub cable entering the the tank by means of a tube provided with a stuffing-box and sometimes buried in pitch. Inside the tank the stub cable leads to conventional multi-pin connectors which are plugged onto those portions of the individual repeater housings which project from the frame. Such boxes require considerable factory wiring, since it is not practical to wire conventional multi-pin connectors to the end of a cable on site.

Repeater boxes are also known which are capable of being wired on site if necessary. Such boxes comprise a tank with a hermetically closing cover, both of which are fixed on a connection chamber. The tank houses a frame comprising a mother board having rows of connectors onto which the individual repeater casings are plugged. Electrical connections are provided by metal inserts mounted through glass beads and passing through a sealing barrier which separates the connection chamber from the inside of the tank, with one set of wiring connecting the metal inserts to the mother board connectors and with an second set of wiring connecting the metal inserts to the conductors of a stub cable which enters into the connection chamber via a stuffing-box arrangement to provide sealing. The drawback of such boxes is that they require a considerable amount of wiring since each link comprises several connections.

Preferred embodiments of the present invention provide a box for repeaters in which the wiring is simplified and can be carried out on site, the box being directly connectable to the end of a cable.

Such boxes are also of simple design providing good sealing and good accessibility to the equipment enclosed therein.

SUMMARY OF THE INVENTION

The present invention provides a box for transmission line repeaters housed in individual casings, said box comprising:

a shallow bowl having a bottom surrounded by low side walls and at least one cable inlet in one of its side walls, together with means for providing sealing thereto;

a mother board serving as a support for repeaters housed in individual casings, said mother board comprising a generally planar electrically insulating base member having an underside, an upper surface and connector tabs passing therethrough to provide electrical connections between said underside and said upper surface, said base member being capable of being fixed in said bowl while leaving sufficient space between its underside and the bottom of the bowl for wiring a cable to the mother board, its upper surface being provided with rows of rimmed slots for guiding and receiving respective individual repeater casings, and the connector tabs passing through the mother board at the bottoms of the slots to provide cable connector terminals on the underside of the mother board and electrical contacts for co-operating with matching contacts placed on a facing end surface of said individual repeater casings; and a bell-shaped cover capable of being hermetically sealed to the bowl and having sufficient inside volume to contain the individual repeater casings when assembled on the mother board.

The volume between the underside of the mother board and the bottom of the bowl may be filled with a potting compound once the wiring has been completed, thereby providing total sealing at the end of the cable.

There is no intermediate wiring in a box in accordance with the invention so the number of breaks, solderings, or interconnections is less than in other boxes, while the assembly is easy to set up on site.

BRIEF DESCRIPTION OF THE DRAWINGS

An embodiment of the invention is described by way of example with reference to the accompanying drawings, in which:

FIG. 1 is a vertical longitudinal section through a repeater box in accordance with the invention;

FIG. 2 is a vertical cross section along a line II—II of FIG. 1;

FIG. 3 is a plan view looking down on the repeater box of the preceding figures with its cover removed;

MORE DETAILED DESCRIPTION

Figure 4:
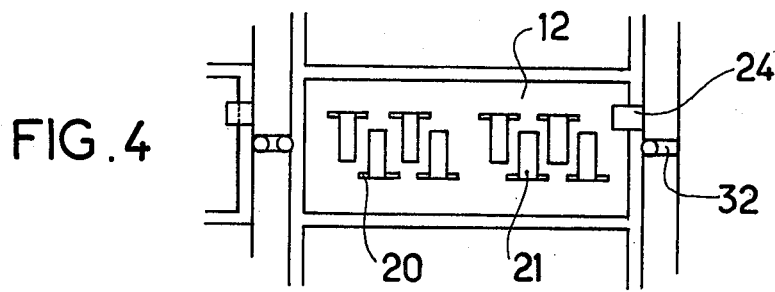
FIG. 4 is a partial plan view, on a larger scale, of a detail of FIG. 3, showing the shape and positioning of a set of contacts of a connector on a mother board located in the repeater box, said contacts being at the bottom of a slot for receiving the base of an individual repeater casing.

FIGS. 1, 2 and 3 show the general organisation and relative positions of the various components of a repeater box in accordance with the invention.

The repeater box comprises a shallow bowl 1 closed by a bell-shaped cover 2 and housing a mother board 3 on which individual repeater casings 4 are fixed.

The bowl is generally rectangular in shape. It has a broad flat rim 5 having a peripheral groove 6 formed therein to house a sealing ring 6a. It is fixed to a support by lugs 7 extending longitudinally from the bottom of the bowl in line with the longer sides thereof. One of its end faces is pierced by an inlet 7a for a line cable 8 together with its sealing system shown in greater detail in FIG. 8, and the other end face is pierced by two orifices closed by respective sealing stoppers 9 for fitting a pressurisation valve and/or service cables used for auxiliary channels, if required. Halfway up along the inside of its side faces, the bowl 1 has horizontal ledges 10 on which the mother board 3 is supported. At the service cable inlet end, the ledges 10 are interconnected by a vertical partition 11 which divides the bottom of the bowl 1 into two compartments which may be separately filled with a potting compound for sealing cable ends.

The mother board 3 comprises a generally flat rectangular insulating base member 3a through which there pass electrical connector tabs. The insulating base member occupies the greater part of the inside area of the bowl 1. Its top face has two rows of shallow slots 12 of suitable dimensions for receiving the bases of individual repeater casings 4. The individual repeater casings 4 stand upright on the mother board 3 with their bases received in the slots 12, and they are held in position by resilient metal clips 13 whose ends are hooked into the insulating base member on either side of the slots 12. Connector tabs described in greater detail below pass through the base member in line with the slots 12 to terminate inside the slots as pressure contacts for co-operating with corresponding pressure contacts placed at the bottoms of the individual repeater casings 4. Said connector tabs provide all the electrical connections between the repeaters and the outside world.

The cover 2 is bell-shaped and has sufficient inside volume to receive all the individual repeater casings 4 fitted on the mother board 3. It has a flat rim 14 matching the rim 5 of the bowl 1 and against which the sealing ring 6a bears. An overhang 15 projects downwardly from the rim 14 and hides the rim 5.

The cover 2 hermetically seals the bowl 1 and is fixed thereto by bolts 14a distributed around the rims 14 and 5, outside the sealing ring in the groove 6.

Figures 5, 6:
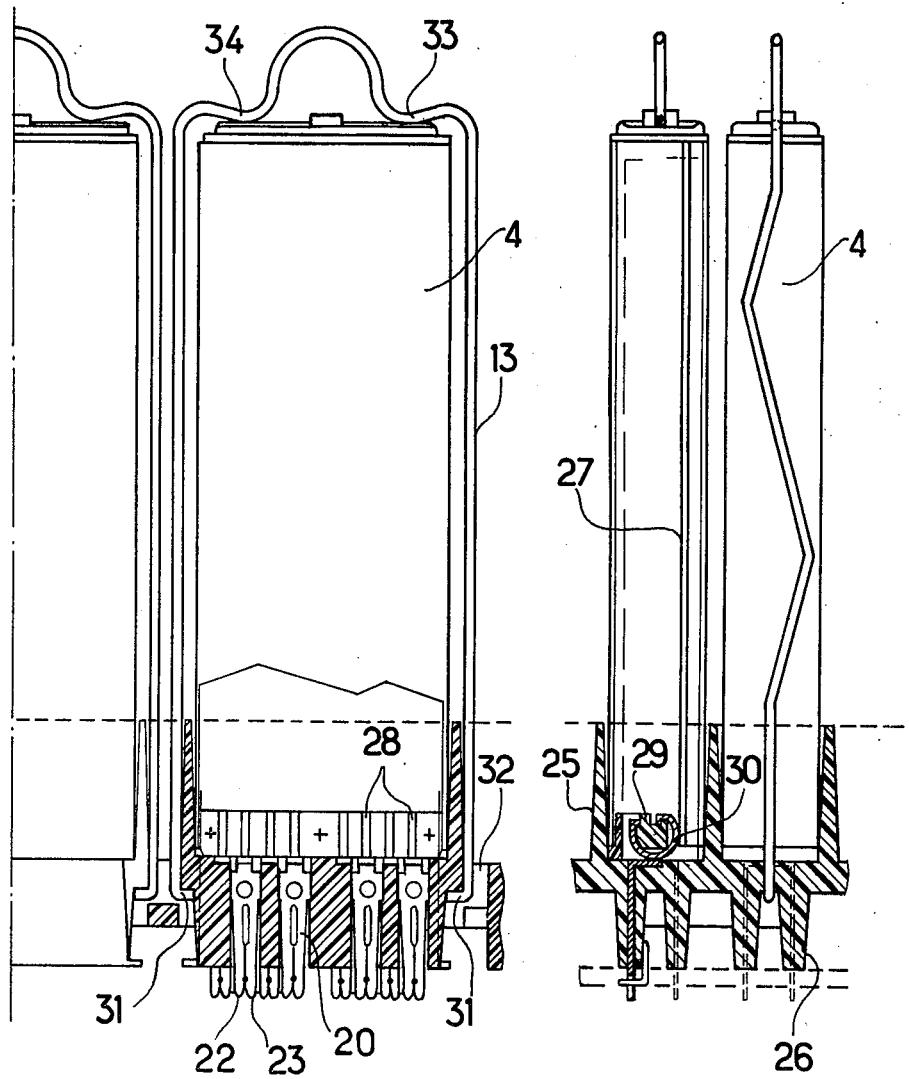
FIG. 5 is a view, on an enlarged scale, of a detail of FIG. 2, showing both the shape of the connector tabs at the bottom of the mother board, and also the shape of spring clips for holding the individual repeater casings in place.
FIG. 6 is a view, on an enlarged scale, of a detail of FIG. 1, showing the ribbed shape of the insulating base member of the mother board.

FIGS. 4, 5 and 6 show the shape of the connector tabs and the shape of the base member of the mother board 3 in greater detail.

The mother board connector tabs 20 are made from a strip of metal from which they are stamped out and folded. The tabs are generally in the shape of a tuning fork, having a stem 21 which is bent at right angles to two prongs 22 and 23 and which lies flat on the bottom surface of a slot 12, with said two prongs projecting downwardly from the stem 21 to constitute a connection which automatically strips wires pushed therein.

As shown in FIG. 4, there are eight connector tabs 20 per slot 12 arranged in two parallel rows long the length of the slot on either side of a center line therethrough, with their stems 21 bent over the center line. In each slot 12 they constitute a rectangular connector having eight flat contacts arranged in a line. The edge of each slot 12 is provided with a key 24 to prevent a repeater casing being plugged into a slot the wrong way around.

The insulating base member is a ribbed structure giving it considerable mechanical strength for relatively light weight. The ribs comprise top surface rings 25 running round each slot 12 and serving to guide the individual repeater casings 4, and bottom surface ribs 26 aligned with the rows of connector tabs 20 in the 12, and through which there are slits to house said tabs.

FIGS. 5 and 6 also show the shapes of the individual repeater casings 4 in greater detail together with their spring clips 13.

Each individual repeater casing 4 is a thin walled parallelipiped shaped canister whose height and width match the length and breadth of a printed circuit 27 housed therein and on which the repeater components are assembled. All the electrical conections between the repeater and the outside world are made via eight parallel conductor tracks 28 at that end of the printed circuit card which is adjacent to the bottom of the casing 4. The eight parallel tracks 28 are at the same spacing as the eight flat contacts 20 aligned along the bottom of the slots 12 in the mother board. Interconnection therebetween is provided by spring contacts 30 fixed on the bottom each individual casing 4. The connector is in the form of an insulating strip 29 having eight spring contacts 30. The insulating strip 29 has eight transverse grooves for locating the eight spring contacts 30 at the same spacing as the eight conductor tracks 28 or the flat contacts at the bottom of the slot 12. The insulating strip is fixed to the end of the printed circuit card 27 where it is accessible via an opening at the end of the individual casings 4. The spring contacts 30 are made from metal strips bent into several flats in a generally polygonal configuration. A first flat 30a projecting from the insulating strip 29 presses against a conductive track 28 of the printed circuit card 27, while a second flat 30b also projecting from the insulating strip 29, but at right angles to the first flat and parallel to the bottom of the end of the individual casing 4, comes opposite to a corresponding flat contact in the slot 12. A notch in one end of the insulating strip 29 engages the key 24 of a slot 12 to ensure that the repeater is inserted the correct way round.

The pressure between the spring contacts 30 on the bottom end of an individual repeater casing 4 and the flat contacts at the bottom of a slot 12 is maintained by spring clip 13 which ensures a force of at least 100 grams per contact and which holds the individual casing 4 down on the mother board 3. The spring clip 13 is made from bent metal wire. It has end hooks 31 which are fastened under the rims of openings 32 in the insulating base member on either side of the slots 12. The upright portions of the spring clips are slightly zigzag in shape to impart the required degree of elasticity thereto. At the top there is a handle in the form of a loop flanked by reverse curves 33 and 34 which snap into grooves provided in the top end faces of the individual repeater casings 4.

Figure 7:
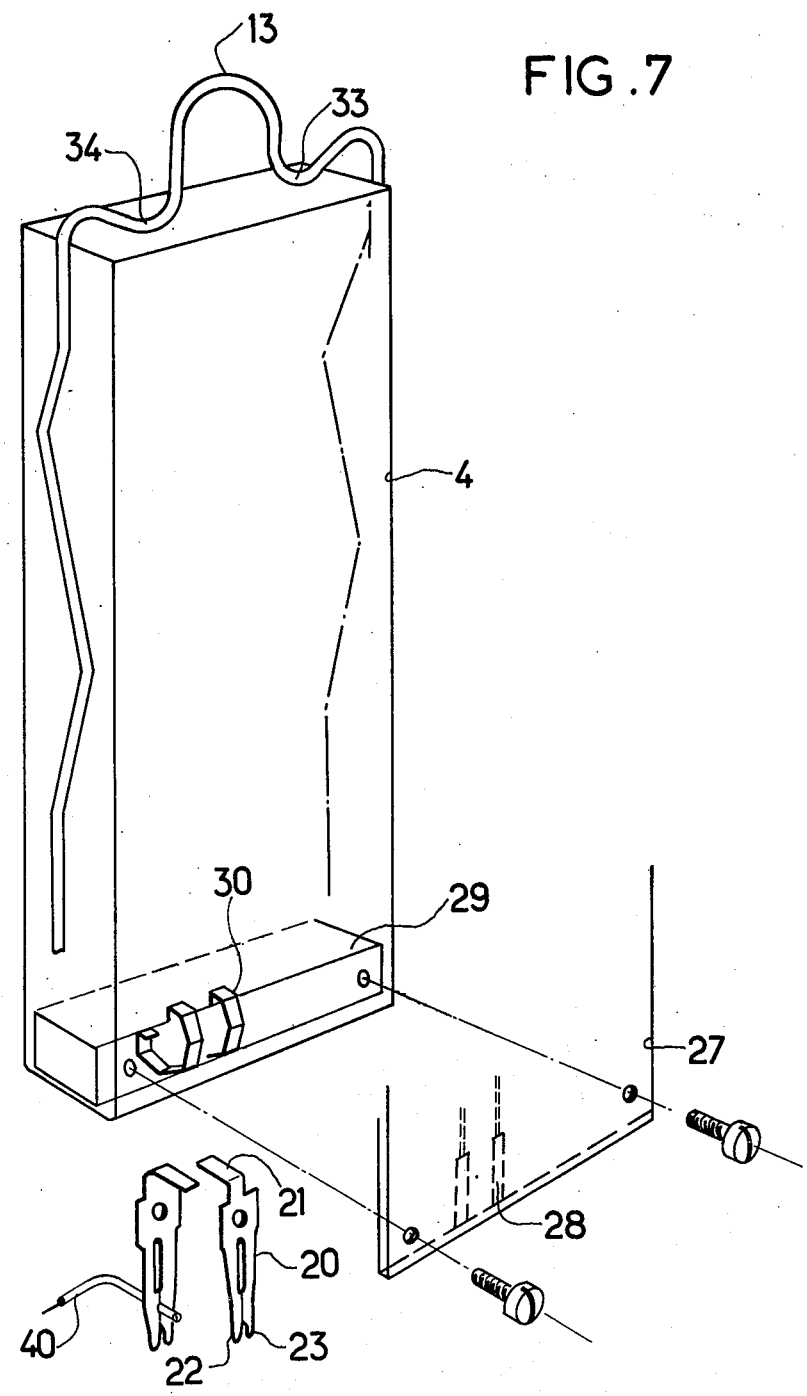
FIG. 7 is an exploded perspective view showing how electrical connection is established inside the repeater box between a printed circuit card on which the repeater components are mounted and a cable conductor leading out of the repeater box.

FIG. 7 shows how few intermediate connections are required to connect a conductor 40 of a line cable 8 (FIG. 8) with a conductor track 28 of a printed circuit card 27 to which the components of a repeater are wired. In fact, the connections only comprise a solder-free connection between the end of a conductor 40 and the prongs 22 and 23 of a tab 20, a spring contact between the stem 21 of the tab 20 and the spring contact 30, and a spring contact between the spring contact 30 and a track 28 on the circuit card 27.

Figure 8:
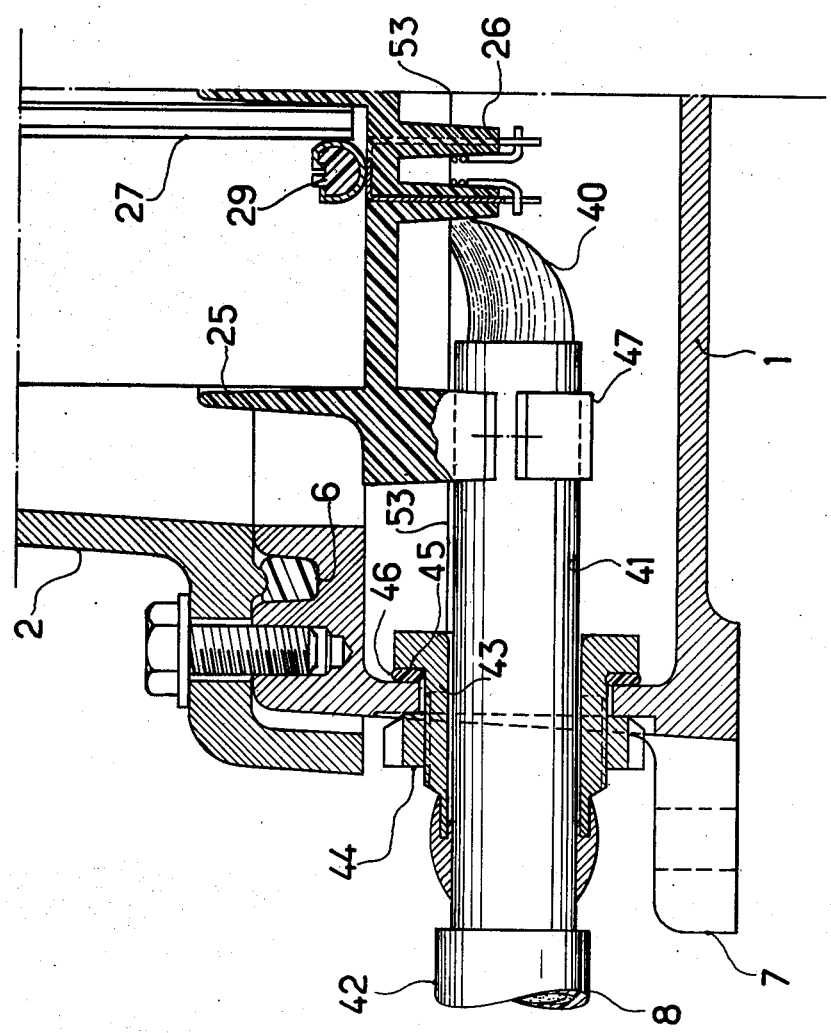
FIG. 8 is a sectional view on an enlarged scale of a detail of FIG. 1 showing how a cable enters the repeater box.

FIG. 8 shows details of a cable 8 entering the bowl 1 together with the accompanying sealing system. The cable 8 is a multi-conductor cable having a metal sheath 41 covered by a protective covering 42. The inlet passage 7a for the cable 8 through the bowl 1 is of larger diameter than the cable 8 so that a length of the cable may be drawn through the inlet passage when the cable is being wired to the mother board 3. Before passing through the bowl 1, the cable 8 is stripped of its protective covering 42 and is threaded through a bushing 43 and a nut 44 which serve to seal the cable to the bowl at the passage through the bowl wall. The bushing 43 is made of metal and its inside diameter fits on the outside diameter of the metal sheath and is bonded thereto. The outside of the bushing 43 has a threaded portion which passes through said passage in the wall of the bowl 1 and receives the nut 44 which is on the outside of the bowl. The remainder of the outside of the bushing is of larger diameter than the threaded portion and forms an abutment surface 45 which presses against the inside surface of the bowl wall via a gasket 46. The free end of the metal cable sheath is held in a cable clamp 47 which is integral with (or at least made fast to) the mother board 3.

Figure 9:
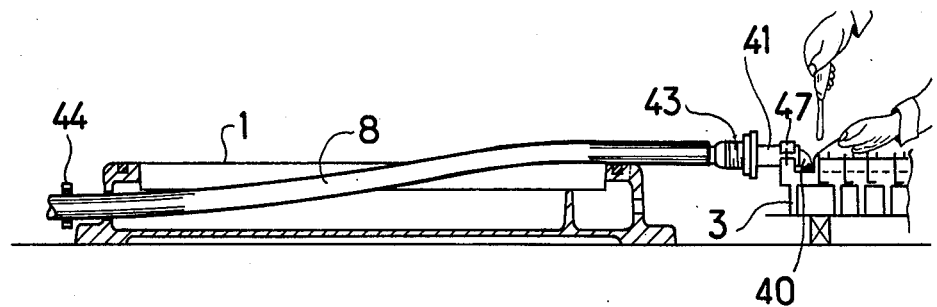
FIG. 9 is an elevational view which shows the respective positions of the bowl of a repeater box, the mother board connector, and the end of a cable during on-site wiring.

FIG. 9 shows the relative positions of the cable 8, the bowl 1 and the mother board 3 while the cable is being wired to the mother board on site. The cable 8 is first passed through the nut 44, and then it is pulled through the inlet passage in the bowl wall, leaving the nut 44 loose on the outside thereof. The end of the cable is then prepared, baring its metal sheath 41 so that the bushing can be bonded thereto. The free end of the cable is then mounted in the cable clamp 47 on the mother board 3 which is turned upside down to provide easy access during wiring.

Figure 10:
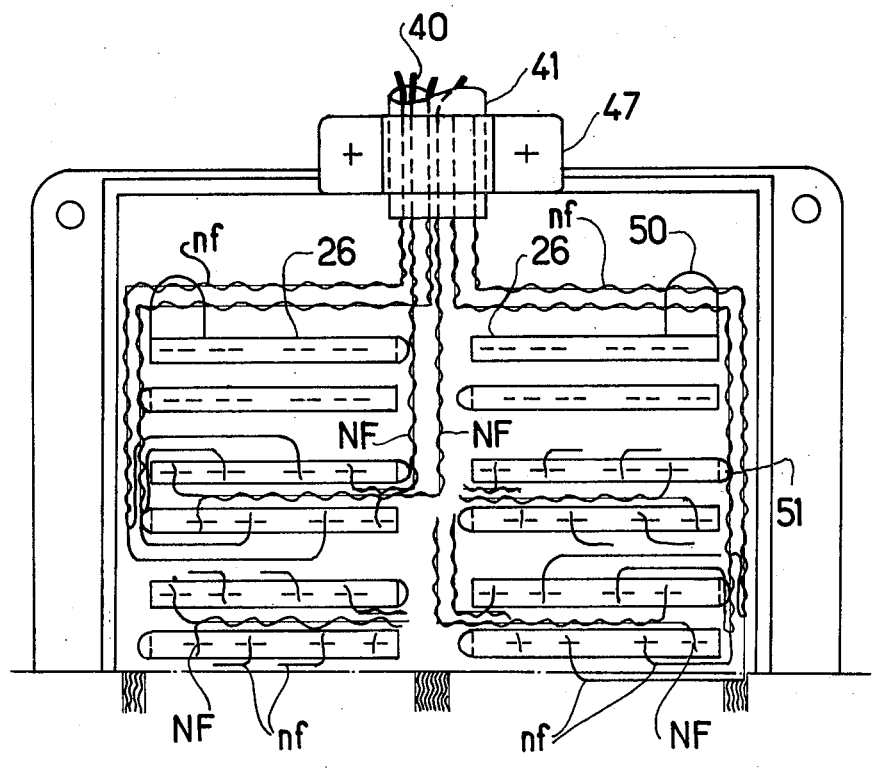
FIG. 10 is a plan view which shows one particular manner in which the mother board in a repeater box may be wired.

The wiring does not need to be soldered since the prongs 22 and 23 of the connector tabs cut through the insulation of the individual conductors and bite into the conductor wire per se. Wiring advantageously follows the plan shown in FIG. 10 which is a view of a portion of the underside of the mother board 3 showing the ribs 26 through which project the prongs 22 and 23 of the connector tabs 20. The gaps in between said ribs 26 serve as channels for guiding the cable wiring. Conductor wires carrying high level signals are referenced NF and are run to the tabs 20 via the central channel, while wires carrying low level signals are referenced nf and are run to the tabs 20 via the outside channels. This arrangement ensures low cross talk. Ledges 50 and 51 project from the ends of the ribs 26 to retain the wiring in the channels.

Once it has been wired to the cable 8, the mother board 3 is turned the right way up, is placed in the bowl 1, and is screwed thereto. The cable side compartment in the bowl is then filled with a potting compound to set the wiring in place and to ensure proper sealing of the cable 8. The depth of the potting compound is not critical, but the end of the cable should be completely covered. A reasonable depth is indicated by a line 53 in FIG. 8.

We claim:

1. In combination, a repeater box, a plurality of transmission line repeaters having individual casings, a transmission cable formed of wires, said repeater box comprising a shallow bowl having at least one cable inlet for the transmission cable and means for providing sealing thereto; a mother board supporting the individual casings of transmission line repeaters and comprising a generally planar electrically insulating base member and connector tabs passing therethrough, said base member being fixed in said bowl while leaving a space between its underside and the bottom of the bowl for wiring the transmission cable to said connector tabs, the base member upper surface being provided with rows of rimmed slots for guiding and receiving the individual casings of transmission line repeaters, the base member underside being provided with channels between said rows of slots, in which channels the wires of the transmission cable are laid on their path between said cable inlet and their destination connector tabs, said connector tabs passing through the base member at the bottoms of the slots and providing cable connector terminals on the underside of the base member and electrical contacts engaging matching contacts placed on a facing end surface of said individual casing; and said repeater box further comprising a bell-shaped cover hermetically sealed to the bowl and having a sufficient inside volume to contain the individual casings of transmission line repeaters when assembled on the mother board.

2. A repeater box according to claim 1, wherein said channels provided in the underside of the base member are divided into two groups, one group serving cable wires conveying high level signal and the other group serving cable wires carrying low level signal.

3. A repeater box according to claim 1, wherein the underside of the base member includes ledges serving as wire guides.

4. A repeater box according to claim 1, further comprising spring clips of metal wire fitted astride each slot of the upper face of the base member and clamping the individual casing of transmission line repeaters in the slots in the mother board.

5. A repeater box according to claim 1, wherein said connector tabs have pairs of prongs projecting below the underside of the mother board to provide a self-stripping connection with an insulated wire from the transmission cable.

6. A repeater box according to claim 1, wherein said connector tabs have a stem portion bent at right angles over a region of the upper surface of the mother board to constitute a connection by pressure against a corresponding contact of a repeater casing.

* * * * *